June 4, 1968   H. ARENBECK   3,386,646
MULTI-PLY SACK

Filed March 13, 1967   3 Sheets-Sheet 1

INVENTOR
HELLMUTH ARENBECK
BY
Woodhams, Blanchard & Flynn
ATTORNEYS

June 4, 1968  H. ARENBECK  3,386,646
MULTI-PLY SACK

Filed March 13, 1967  3 Sheets-Sheet 2

INVENTOR
HELLMUTH ARENBECK
BY
Woodhams, Blanchard & Flynn
ATTORNEYS

June 4, 1968  H. ARENBECK  3,386,646
MULTI-PLY SACK

Filed March 13, 1967  3 Sheets-Sheet 3

INVENTOR
HELLMUTH ARENBECK
BY
Woodhams, Blanchard & Flynn
ATTORNEYS

United States Patent Office 3,386,646
Patented June 4, 1968

3,386,646
MULTI-PLY SACK
Hellmuth Arenbeck, Wilhelm-Raabe-Weg 3,
Goslar, Germany
Filed Mar. 13, 1967, Ser. No. 622,585
8 Claims. (Cl. 229—55)

ABSTRACT OF THE DISCLOSURE

A multi-ply sack of paper, plastics material sheeting or the like has the following features:
(a) The tube ends of the tube section used in the manufacture of the sack are provided in all plies with protruding, uniformly shaped tongues and with uniformly shaped recesses between the tongues;
(b) The tongues of the various plies of the sack are laterally staggered relative to each other in such a manner that the recesses of each sack ply are substantially covered by the tongues of other sack plies;
(c) The seam portions which are preferably adhesively bonded to each other are formed on both sides substantially by the tube end portions provided with the tongues, and the tongue center lines of the tube end portions, which lines intersect the tongues in the middle of their length, extend at least close to the center lines of the seams.

This invention relates to a multi-ply sack made from paper, plastics material sheeting, or the like. In known processes of making such sacks, the plies are first formed into tubes, from which tube sections are subsequently severed. The length of said tube sections equals the sum of the length and end width of the sacks to be made plus an overlap allowance required for the formation of the end seams. This overlap allowance must always be taken into account regardless of the type of end seam. The overlap extra length does not contribute to the useful volume of the sack but must be added to the theoretical peripheral surface in sacks of any known design. The overlap allowance is usually about 5% of the sum of the sack length and end width. As many thousands of millions of German marks are spent annually throughout the world for starting materials for use in the manufacture of sacks, hundreds of millions of German marks are spent only for the overlap allowance, which is of no use in the finished sack. The fact that the number of plies is doubled in the end seam even reduces the desirable flexibility and stability of the end of the sack.

It is an object of the invention to provide a sack, and a process of manufacturing sacks, wherein the additional expenditure of material for the overlapping seam portions is largely or entirely eliminated whereas the strength of the end seams is not adversely affected.

In a multi-ply sack of paper, plastics material sheeting or the like, this object is accomplished by the combination of the following features:
(a) The tube ends of the tube section used in the manufacture of the sack are provided in all plies with protruding, uniformly shaped tongues and with uniformly shaped recesses between the tongues;
(b) The tongues of the various plies of the sack are laterally staggered relative to each other in such a manner that the recesses of each sack ply are substantially covered by the tongues of other sack plies;
(c) The seam portions which are preferably adhesively bonded to each other are formed on both sides substantially by the tube end portions provided with the tongues, and the tongue center lines of the two tube end portions, which lines intersect the tongues in the middle of their length, extend at least close to the centerlines of the seams.

The tongues and recesses having a center line which extends close to the center line of the seam ensure that the material of the protruding tongues is at least approximately compensated by the saving of material due to the recesses. As the tongues are laterally staggered, sufficiently wide lap portions and mating surfaces formed by the exposed portions of the tongues of the various plies of the sacks are available. The design of the tube ends according to the invention provides overlapping parts without need for additional material. As will be shown more in detail hereinafter, the design according to the invention affords the special advantage that in the unsevered web used in the manufacture of sacks the tongues and recesses of successive tube sections complement in such a manner that the tongues of the leading tube section are formed by the material which corresponds to the recesses of the trailing tube section and vice versa. As a result, there is no need for a continuous overlap allowance in each tube ply, whereas such overlap allowance was previously required and involved an additional expenditure of material. Further advantages reside in that the resulting sacks have at the end about the same thickness as in their upright walls so that their flexibility and stability is increased, and that all sack plies in the margins to be bonded together are directly bonded to the other half of the seam without need for a particularly complicated design of the tube margins or for a staggering in the longitudinal direction of the tube. Such measures were previously considered inevitable to ensure a direct bonding of each of said plies.

It is known from the U.S. patent specification No. 1,929,229 to provide uniformly shaped tongues and uniformly shaped recesses between the tongues in individual plies of the tube sections used in the manufacture of sacks, and to stagger the tongues of the individual sack plies laterally in such a manner that the recesses of each sack ply are substantially covered by the tongues of other sack plies. According to said prior publication, however, the tongues and recesses are not provided in all plies and are not provided through the width of the plies formed with such tongues and recesses. According to the prior publication, the outer and inner plies of the sack are solid in the end area and there are no tongues and recesses in the side gusset area. For this reason, the sack according to the U.S. patent specification requires the known overlap allowance, and recesses defining the tongues are only cut out of the intermediate sack plies in additional operations. The cut-out material is wasted. According to the U.S. patent specification No. 1,929,229, the use of intermediate plies provided with tongues and recesses has the object of improving the flexibility and stability of the sack end. A saving of material and costs is not achieved. On the contrary, the cost of the sacks is increased by the additional operations of forming the recesses and discarding the cut-out portions. For this reason, the sacks according to the U.S. patent specification No. 1,929,229 have not been successful in practice.

It is known from the German patent specification No. 583,614 to form differently shaped incisions in the tube section in the portions which are to be infolded to form the side flaps so that differently shaped tongues and recesses are obtained and the edges to be folded can easily be gripped by hand. The said publication relates to the formation of sack ends which are folded twice one into the other. The described design facilitates the interfitting of two-ply ends to be folded. A saving of sack material is neither achieved nor desired. Just as with the sack according to the U.S. patent specification No. 1,929,229, the tongues and recesses are made from the usual overlap material so that additional costs are incurred.

The two known sack designs have no relation to the object of the present invention. As the two prior patent specification have been known for more than three decades, the known suggestion to provide tongues and recesses in the tube edges has obviously failed to teach the persons skilled in the manufacture of sacks a solution to the problem which underlies the present invention.

In a development of the invention, the recesses and tongues may be congruent. In this case, the two sack ends have the same design. Alternatively, the tongues may be wider in one sack end and the recesses may be wider in the other sack end. In this case the sack end provided with the narrower tongues has a higher permeability to air than the other end so that the sack can be vented quickly without need for the known needling of the walls of the sacks.

According to the invention, the tongues and recesses may be formed by shaping the tube ends of the sack plies according to true or distorted sine curves. In this case the center lines of the tongues are formed by the zero sine lines.

In another embodiment of the invention, the center lines of the seam coincide with the center lines of the tongues. In this case the overlapping seam portions consist only of the tongues which are formed on the tube edges. In this preferred embodiment of the invention, no additional material at all is required for the seam because those tongue portions which extend beyond the center line of the seam are exactly compensated by the areas which are re-entrant with respect to said line, provided that the recesses and tongues have the same width.

The center line of each seam may extend through the other halves of the length of the tongues. Just as the use of narrower tongues, this design will result in a higher permeability of the sack end to air. On the other hand, a particularly dense seam will be obtained if the center line of each seam extends across the inner half of the length of the tongues. In this case, however, the formation of the seam involves an expenditure of material in addition to that required to define the desired sack volume.

The tongues of each ply may be laterally staggered relative to the tongues of the adjacent plies by such a fraction of the total width of one tongue and one recess as corresponds to the number of plies. This design will result in a seam which has a maximum tightness, which is not lower than in conventional sacks. In a development of the invention, the tongues of each ply may be laterally staggered relative to the tongues of the other plies by different amounts so that thinned portions may be provided in the sack end where this is desired in order to control the permeability of the sack end to air simply by a selection of the amounts by which the tongues are staggered. This measure will also eliminate the need of the above-mentioned piercing of the sack to ensure a sufficiently high permeability to air. This piercing has various disadvantages.

The method of manufacturing according to the invention is characterized in that transverse lines of weakness, which define waves and alternately project and recede, are formed in a plurality of continuously moved webs in such a manner that the distance between the center lines of the waves, which center lines extend at right angles to the longitudinal direction of the web, is at least approximately as large as the sum of the length and end width of the sacks to be manufactured, the webs are combined and formed into a tubing in such a manner that the wave lines are laterally staggered and the center lines of the waves coincide, and tube sections are then torn off and formed into sacks in known manner. The new process results in considerable savings whereas the output is increased. In the manufacture of sacks in all sizes and with all sack end widths, only a single perforating and transverse bonding unit is required for each ply whereas it was previously required in most cases to exchange the tools when a change to a sack of different size was required. The conversion and setting-up times which were previously always required and amounted to as much as one-fifth of the operating time of the machine are now almost completely eliminated. Besides, the lateral staggering of the tongues can be adjusted once and can be controlled to a large extent automatically during the operation of the machine.

The invention will be explained more fully hereinafter with reference to the drawings, in which.

Figure 1:
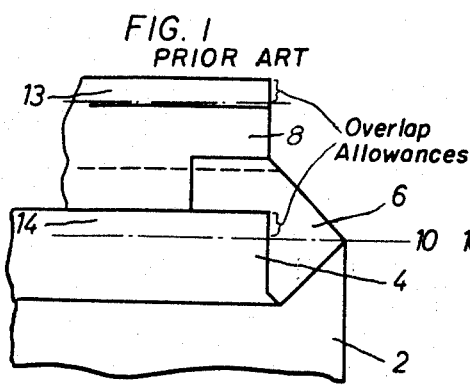
FIG. 1 shows a sack blank having a partly folded, crossed sack end and intended for use in the manufacture of a sack in the previously known manner.

The sack blank 2 shown in FIG. 1 is provided with the reversely folded side flap 4, the infolded corner portion 6 and the still open side flap 8. The overlap allowance portions 13, 14 extend beyond the center line 10 of the seam. It is clearly apparent that the overlap allowance portions involve a considerable expenditure of material.

Figure 2:
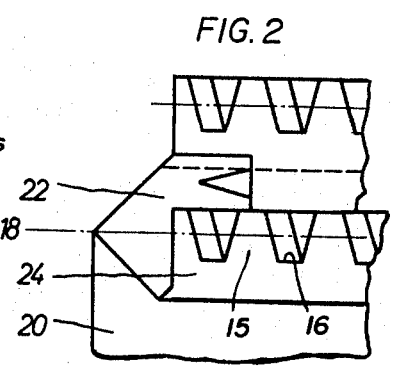
FIG. 2 is a view similar to FIG. 1 and shows a sack blank made according to the invention.

FIG. 2 shows a sack blank according to the invention in the same state as that shown in FIG. 1. The ends of the tube plies are provided across their width with uniformly shaped, trapezoidal tongues 15 and corresponding recesses 16. As is shown in the drawing, the tongues 15 are congruent with the recesses 16 and the tongues extend beyond the center line 18 of the seam with a portion which is congruent with the area by which the adjacent recesses are re-entrant with respect to the center line of the seam. The recesses 16 of the top tube ply are covered by the tongues of the underlying tube plies so that a closed surface is available for the adhered seam. As is apparent from FIG. 2, the overlap allowance portion (13, 14 in FIG. 1) previously required at both ends of each ply is eliminated between the sack blanks because adjacent tongues 15 of the sack blank 20 are formed by providing the adjacent sack blank, not shown with recesses which exactly conform to the tongues in form and size. It is also apparent from FIG. 2 that the tongues and recesses are provided at the tube ends throughout the width of the tube, also at the infolded corner portion 22. This has the advantage that all plies of the infolded corner portions are adhered to the reversely folded side flap 24 and a good bond is also obtained between adjacent plies so that a good seal is provided against the undesired penetration of the sack contents between adjacent plies of the infolded corner portions. In sacks of known design, this object can be accomplished only if the various plies of the tube are formed from blanks having different, extremely intricate configurations.

Figure 3:
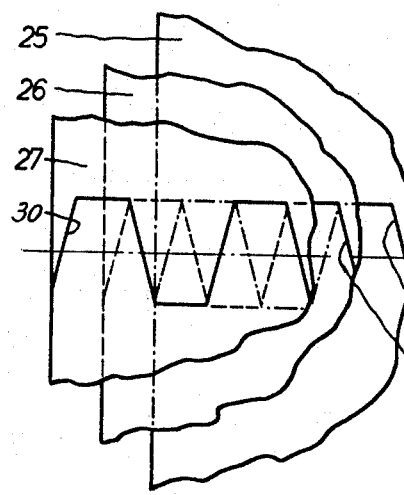
FIG. 3 shows three superimposed plies of material, which are provided according to the invention with transverse lines of weakness, before the formation of a tube.

By way of example, FIG. 3 shows three plies 25, 26, 27, which have been provided with transverse lines of weakness 28, 29, 30 by perforating tools. To make sack blanks as shown in FIG. 2, in which the center lines of the tongues coincide with the center line 18 of the seam, the spacing between successive center lines 31 of the tongues is chosen to be equal to the sum of the length and one end width of the sacks to be made, without the previously required overlap allowance shown in FIG. 1. It is apparent from FIG. 3 that the plies 25–27 are relatively staggered by equal amounts, which are equal to one third of the overall width of a tongue and of the adjacent recess. As a result, the end edges of the tongues form a continuous, straight line so that a tightly sealed end seam is obtained when the tubing has been formed, the tube sections are torn off at the transverse lines of weakness of the several plies, and the sack end has been formed.

Figure 4:
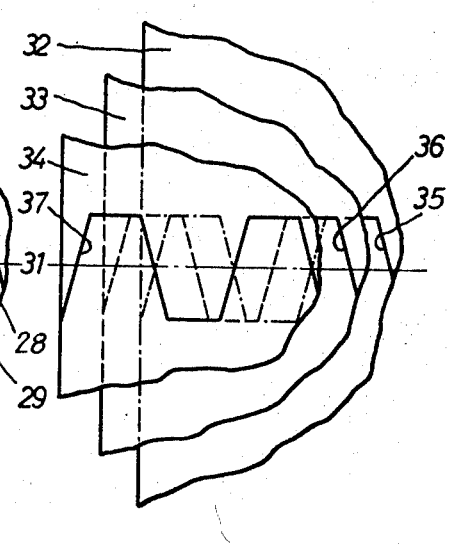
FIG. 4 is a view similar to FIG. 3 and shows a different lateral staggering of the webs.

In the embodiment of FIG. 4, the plies 32, 33, 34 are staggered by different amounts so that the transverse lines of weakness 35, 36, 37 taken together no longer form a straight line but the line defined by the end edges of the tongues is interrupted between the tongues of the plies 32 and 33 in the upper tube section and between the tongues of the plies 33 and 34 in the lower tube section so that the resulting sacks have a higher permeability to air, as has been described hereinbefore.

Figure 5:
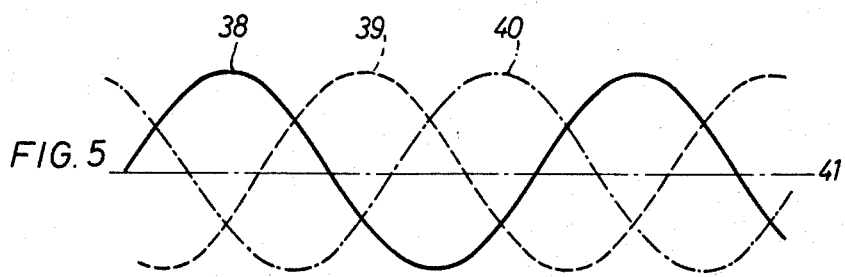
FIGS. 5–10 show different forms of the tongues and recesses used according to the invention for forming a seam.
Figure 6:
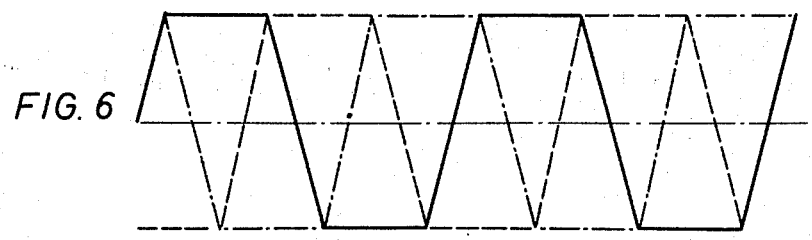
Figure 7:
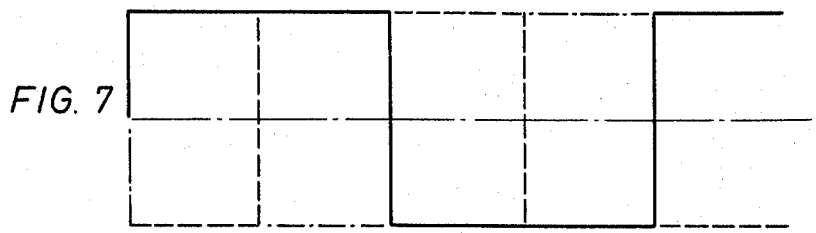
Figure 8:
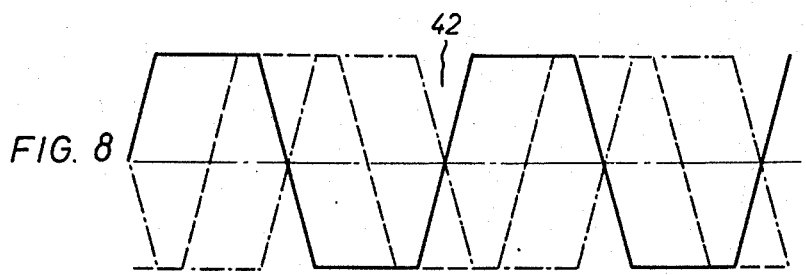

FIGS. 5 to 8 show different forms of transverse lines of weakness in three superimposed plies. FIG. 5 shows transverse lines of weaknesses 38, 39 and 40 in the form of sine curves. The transverse lines of weakness shown in FIGS 6 and 7 are distorted sine curves. In FIG. 6, the tongues and recesses are trapezoidal in FIG. 6 and rectangular in FIG. 7. In the designs of FIGS. 5 and 6 the sine curves of the various plies are staggered by amounts which are regularly distributed over the sine periods formed by the total width of a tongue and the adjacent recess. In the designs of FIGS. 7 and 8, the tongues are staggered by different amounts so that there are joints in FIG. 7 which are not covered by a further tongue and the line formed by the end edges of the tongues is interrupted at 42 in FIG. 8. In this way, the permeability of the sack ends to air is increased.

Figure 9:
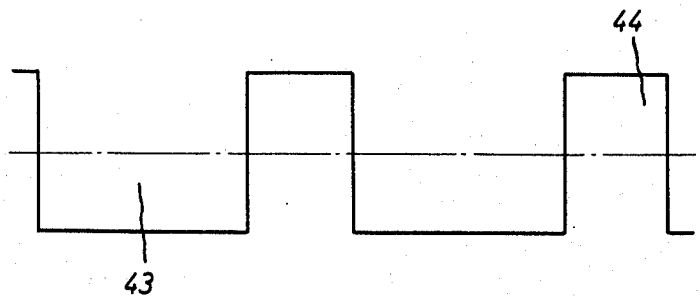

In the arrangement of FIG. 9, the tongues 43 of the upper tube section are wider than the tongues 44 of the lower tube section, which latter tongues determine the width of the recesses in the upper tube section. With such a design, the lower end (bottom) of the sack formed by the leading tube section is less permeable to air than the top end of the sack formed by the trailing tube section.

Figure 10:
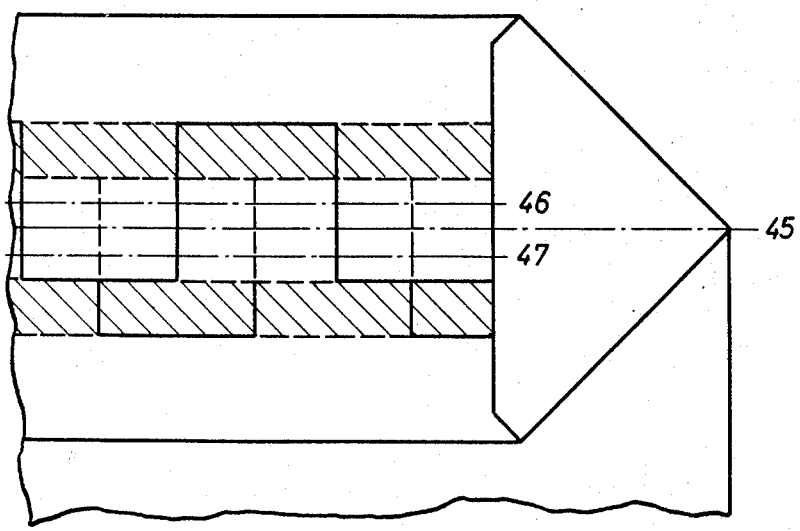

FIG. 10 shows a sack bottom in which the center line 45 of the seam does not coincide with the center lines 46 and 47 of the tongues but extends through the outer portions of the tongues on both sides of the seam. This will also result in an end seam which is more permeable to air. Hatching indicates the thinner zones, which are not overlapped.

What is claimed is.

1. A multi-ply sack, comprising:
a tube comprised of a plurality of superposed plies, the tube having at least at one end thereof integral, infolded corner portions and a pair of integral side flaps overlapping and secured to said corner portions, said flaps also overlapping and being secured to each other, characterized by the improvement that the edge of each of the plies at said one end thereof has along the entire length thereof a series of protruding and substantially uniformly shaped tongues separated by substantially uniformly shaped recesses between said tongues, the tongues of the respective plies in each flap being laterally offset from the tongues of adjacent plies and being arranged so that the recesses in each ply of each flap are substantially covered by the tongues on the remaining plies and any tongue on one of said flaps is lapped with and is affixed to a tongue on at least one ply on the other flap whereby said flaps are secured together, any tongue of a ply on said corner portions also being lapped with and affixed to a tongue on at least one ply of one of the flaps whereby said corner portions are secured to said flaps, the center line of the zone along which said flaps are affixed to each other and to said corner portions being located at least close to the center line through and crosswise of said tongues.

2. A sack according to claim 1, characterized in that the recesses and tongues are congruent.

3. A sack according to claim 2, characterized in that the tongues and recesses are formed by sinuous edges of the plies.

4. A sack according to claim 1, characterized in that the center line of the zone coincides with the center lines of the tongues.

5. A sack according to claim 1, characterized in that the center line of said zone extends through the outer half of the lengthwise extent of the tongues.

6. A sack according to claim 1, characterized in that the center line of said zone extends through the inner half of the lengthwise extent of the tongues.

7. A sack according to claim 1, characterized in that the tongues of each ply are laterally staggered relative to the tongues of the adjacent plies by a fraction of the total width of one tongue and one recess corresponding to the reciprocal of the number of plies.

8. A sack according to claim 1, characterized in that the tongues of each ply are laterally staggered by different amounts from the tongues of adjacent plies.

References Cited

UNITED STATES PATENTS 1,929,229 10/1933 Woodward _____ 229—55
2,990,102 6/1961 Duffin _____ 229—55

DAVID M. BOCKENEK, *Primary Examiner.*